(12) United States Patent
Samadani et al.

(10) Patent No.: US 8,553,103 B1
(45) Date of Patent: Oct. 8, 2013

(54) COMPENSATION OF AMBIENT ILLUMINATION

(75) Inventors: Ramin Samadani, Palo Alto, CA (US); Thomas G. Malzbender, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 376 days.

(21) Appl. No.: 12/570,700

(22) Filed: Sep. 30, 2009

(51) Int. Cl.
*H04N 9/73* (2006.01)
*H04N 5/235* (2006.01)
*H04N 5/238* (2006.01)

(52) U.S. Cl.
USPC ......... 348/223.1; 348/362; 348/364; 348/366

(58) Field of Classification Search
None
See application file for complete search history.

(56) References Cited

U.S. PATENT DOCUMENTS

| | | | |
|---|---|---|---|
| 2004/0005086 A1* | 1/2004 | Wolff et al. | 382/118 |
| 2005/0249381 A1* | 11/2005 | Silvester et al. | 382/115 |
| 2007/0058860 A1* | 3/2007 | Harville et al. | 382/167 |
| 2008/0298571 A1* | 12/2008 | Kurtz et al. | 379/156 |
| 2009/0175555 A1* | 7/2009 | Mahowald | 382/274 |
| 2009/0273661 A1* | 11/2009 | Mauchly | 348/14.08 |
| 2010/0328475 A1* | 12/2010 | Thomas et al. | 348/222.1 |
| 2011/0205240 A1* | 8/2011 | Marks et al. | 345/589 |

OTHER PUBLICATIONS

Wang, Oliver et al., "Video Relighting Using Infrared Illumination", *Eurographics 2008*, vol. 27 (2008), No. 2, (2008),9 pages.

\* cited by examiner

*Primary Examiner* — Lin Ye
*Assistant Examiner* — John H Morehead, III

(57) ABSTRACT

Compensation of ambient illumination. A visible image of an object with ambient illumination is captured. Image brightness of at least a portion of said object of said visible image is sampled. A difference between sampled image brightness of at least said portion of said object and a target brightness profile is determined. The difference is compensated for by projecting additional illumination onto said object.

13 Claims, 4 Drawing Sheets

COMPENSATION OF AMBIENT ILLUMINATION

FIELD

Various embodiments of the present invention relate to the field of video processing.

BACKGROUND

Video conferencing is an increasingly prevalent communication source due to technological advances that allow easy video capture and transmission. For instance, many computer systems include built-in cameras facilitating video capture. Similarly, peripheral cameras are inexpensive and easy to use.

Typically, video captured for use in video conferencing suffers from various degrees of poor illumination. In general, video conferencing typically occurs in locations in which full control of lighting is not available to participants. For example, a user may participate in a video conference in a room having simple lighting controls, typically limited to on and off. Poor lighting can result in video capture that does not fully and accurately capture the object of the video capture. For instance, the resultant video may suffer from an unevenly lit participant with harsh, sharp shadows, and shadow regions lacking detail. These deficiencies may prevent a participant from seeing the facial expressions of another participant or reading text, and generally diminishes the video teleconference experience.

BRIEF DESCRIPTION OF THE DRAWINGS

The accompanying drawings, which are incorporated in and form a part of this specification, illustrate embodiments of the present invention.

Figure 1:
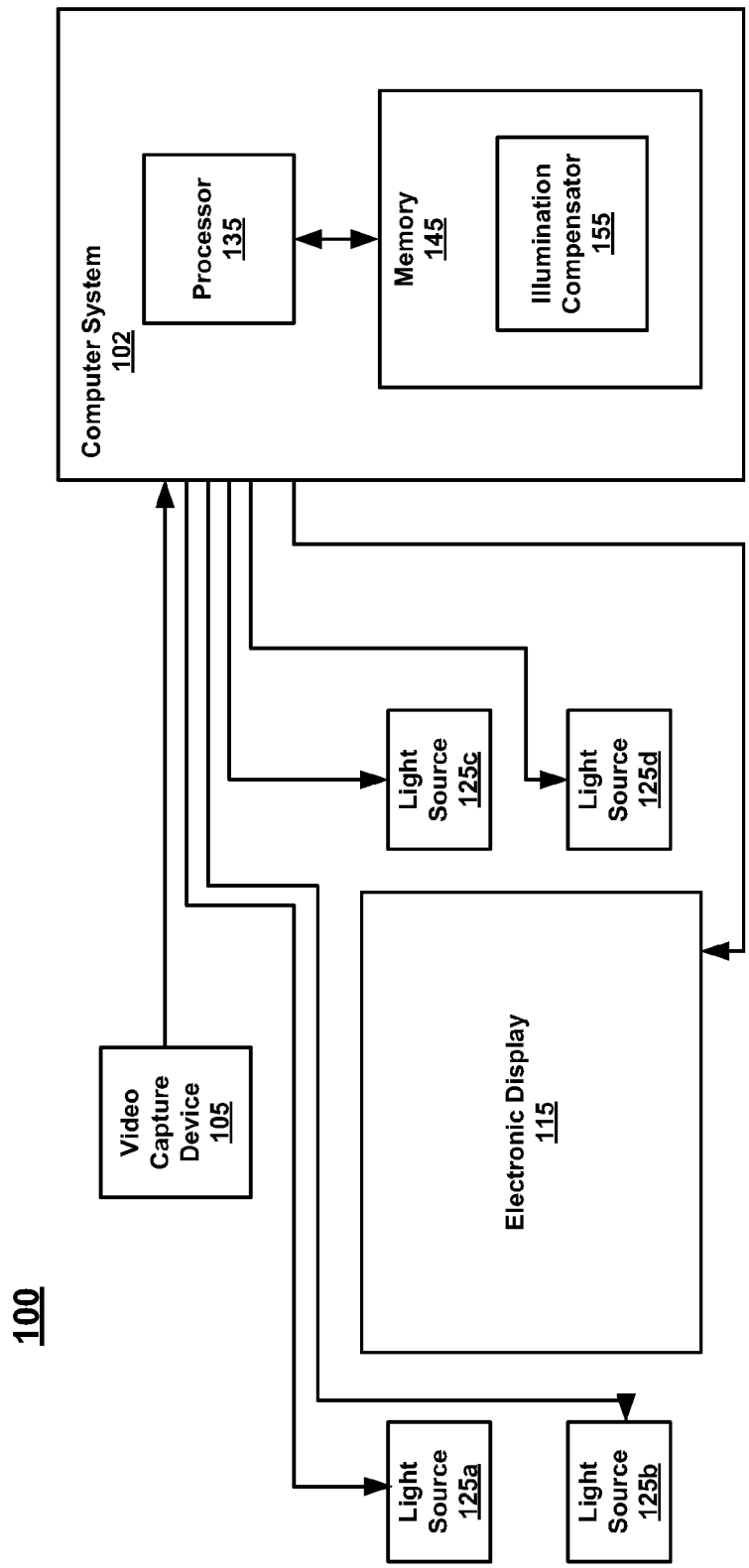
FIG. 1 is a block diagram of a system compensating for insufficient illumination on an object, in accordance with one embodiment of the present invention.

The drawings referred to in the description of embodiments should not be understood as being drawn to scale except if specifically noted.

DESCRIPTION OF EMBODIMENTS

Various embodiments of the present invention, compensation of ambient illumination, are described herein. In one embodiment, a method for compensation of ambient illumination using additional ambient illumination is described. A visible image of an object with ambient illumination is captured. Image brightness of at least a portion of the object of the visible image is sampled. A difference between sampled image brightness of at least the portion of the object and a target brightness profile is determined. The difference is compensated for by projecting additional illumination onto the object.

In another embodiment, a method for compensation of ambient illumination using virtually simulated additional illumination is described. A visible image of an object with ambient illumination is captured. At least one infrared light is projected onto the object. A plurality of infrared images of the object is captured. A plurality of surface normal vectors for a plurality of points of the visible image is calculated using the plurality of infrared images of the object. The visible image of the objected is modified by using the plurality of surface normal vectors to virtually simulate additional illumination.

In another embodiment, an electronic device for compensating for insufficient illumination on an object is described. The electronic device includes at least one camera configured to capture images of an object with at least ambient illumination, an electronic display, a plurality of individually controllable light sources adjacent to the display for projecting illumination onto the object, a processor, and a computer-readable memory having stored therein instructions that when executed by the processor compensate for insufficient ambient illumination on at least a portion of the object by providing additional illumination using at least the individually controllable light sources.

Reference will now be made in detail to various embodiments of the present invention, examples of which are illustrated in the accompanying drawings. While the present invention will be described in conjunction with the various embodiments, it will be understood that they are not intended to limit the invention to these embodiments. On the contrary, embodiments of the present invention are intended to cover alternatives, modifications and equivalents, which may be included within the spirit and scope of the appended claims. Furthermore, in the following description of various embodiments of the present invention, numerous specific details are set forth in order to provide a thorough understanding of embodiments of the present invention. In other instances, well known methods, procedures, components, and circuits have not been described in detail as not to unnecessarily obscure aspects of the embodiments of the present invention.

Embodiments of the present invention provide for compensation of ambient illumination for in video capture environments, e.g., video conferencing. Embodiments of the present invention relates to compensation of ambient illumination using adaptive control of a set of lights. For example, embodiments of the present invention may be used in video conferencing with non-professional participants in casual, non-studio settings. Various embodiments of the present invention provide for the replacement of distracting and bright studio lights while creating good lighting for the video capture. In one embodiment, the scene is analyzed for the lighting condition of an object being captured. In another embodiment, the scene is analyzed to determine surface normal vectors for an object being captured. The extracted scene information, e.g., brightness sampling or surface normal vectors, may be used to either add to the visible lighting in subtle non-distracting ways or by enhancing the video signals by digital means. For example, in one embodiment, visible lighting is automatically projected onto the object to improve the existing ambient lighting. In another embodiment, the surface normal vectors are used to improve the visible light video using digital software-based video enhancement techniques to modify the captured visible images.

FIG. 1 is a block diagram of a system 100 for compensating for insufficient illumination on an object, in accordance with one embodiment of the present invention. System 100 includes computer system 102, video capture device 105, electronic display 115, and light sources 125a-d. Computer system 102 includes processor 135 and memory 145, where memory 145 has stored therein illumination compensator 155 that when executed by processor 135 performs illumination compensation. In one embodiment, computer system 102 is a computing device capable of communicating over a network connection (not shown). For example, computer system 102 may be any type of computing device, including without limitation computers, cellular telephones, personal digital assistants, television sets, set-top boxes, and any other computing device capable of receiving and transmitting data over a network.

It should be appreciated that illumination compensator can be implemented as software, hardware, firmware, or any combination thereof. Moreover, it should be appreciated that computer system 102 may include additional components that are not shown so as to not unnecessarily obscure aspects of the embodiments of the present invention.

Video capture device 105 is configured to capture images of an object in a scene that is illuminated by ambient light. In one embodiment, video capture device 105 is a camera for capturing visible images of the object in the scene. In another embodiment, video capture device 105 includes a plurality of infrared cameras for capturing infrared images of the object in the scene when illuminated by infrared illumination. It should be appreciated that video capture device 105 can include any number of cameras for capturing images of the scene. It should also be appreciated that cameras that can capture both infrared and visible light may be used in various embodiments of the present invention.

Electronic display 115 is configured to display digital data received from computer system 102. For instance, in a video conferencing environment, electronic display 115 may display a remote video conference participant. Continuing with this example, visible images captured by video capture device 105 may be communicated to a remote video conferencing location, for display on an electronic display for presentation to the remote video conference participant. It should be appreciated that electronic display 115 can be any type of display able to present visual information, including without limitation, a liquid crystal device (LCD), a plasma display, a video projector device, a cathode ray tube (CRT), or other display device suitable for rendering video images.

Light sources 125a-d are configured to project illumination onto an object in a scene. In one embodiment, light sources 125a-d are individually controllable such that each light source can provide illumination independently of other light sources. For example, light source 125a may be at full power, light source 125b may be at half power, and light sources 125c and 125d may be turned off. In one embodiment, light sources 125a-125d are adjacent to electronic display 115. It should be appreciated that light sources 125a-d can be any type of light source able to provide illumination, including without limitation, point light sources or area light sources, light emitting diodes (LEDs), organic LEDs (OLEDs), light emitting polymers (LEPs), or other light sources for providing illumination.

In one embodiment, light sources 125a-d are diffuse light sources for projecting diffuse light onto an object in a scene. In another embodiment, light sources are overlaid with a diffuser such that diffuse light is projected onto the object. For example, when the object is a person, diffuse light provides less of a distraction for the person.

In one embodiment, light sources 125a-d are area light sources for projecting diffuse light onto an object in a scene. For example, when the object is a person, an area light provides less of a distraction for the person.

In one embodiment, light sources 125a-d include visible light sources for projecting visible light onto the object. In another embodiment, light sources 125a-d include infrared light sources for projecting infrared light onto the object. It should be appreciated that embodiments of the present invention can include any number of light sources, and is not limited to the illustrated embodiment. Moreover, it should be appreciated that any number of the light sources can be visible light sources, infrared light sources, light sources configured to provide both visible light and infrared light, or any combination thereof.

Figure 2:
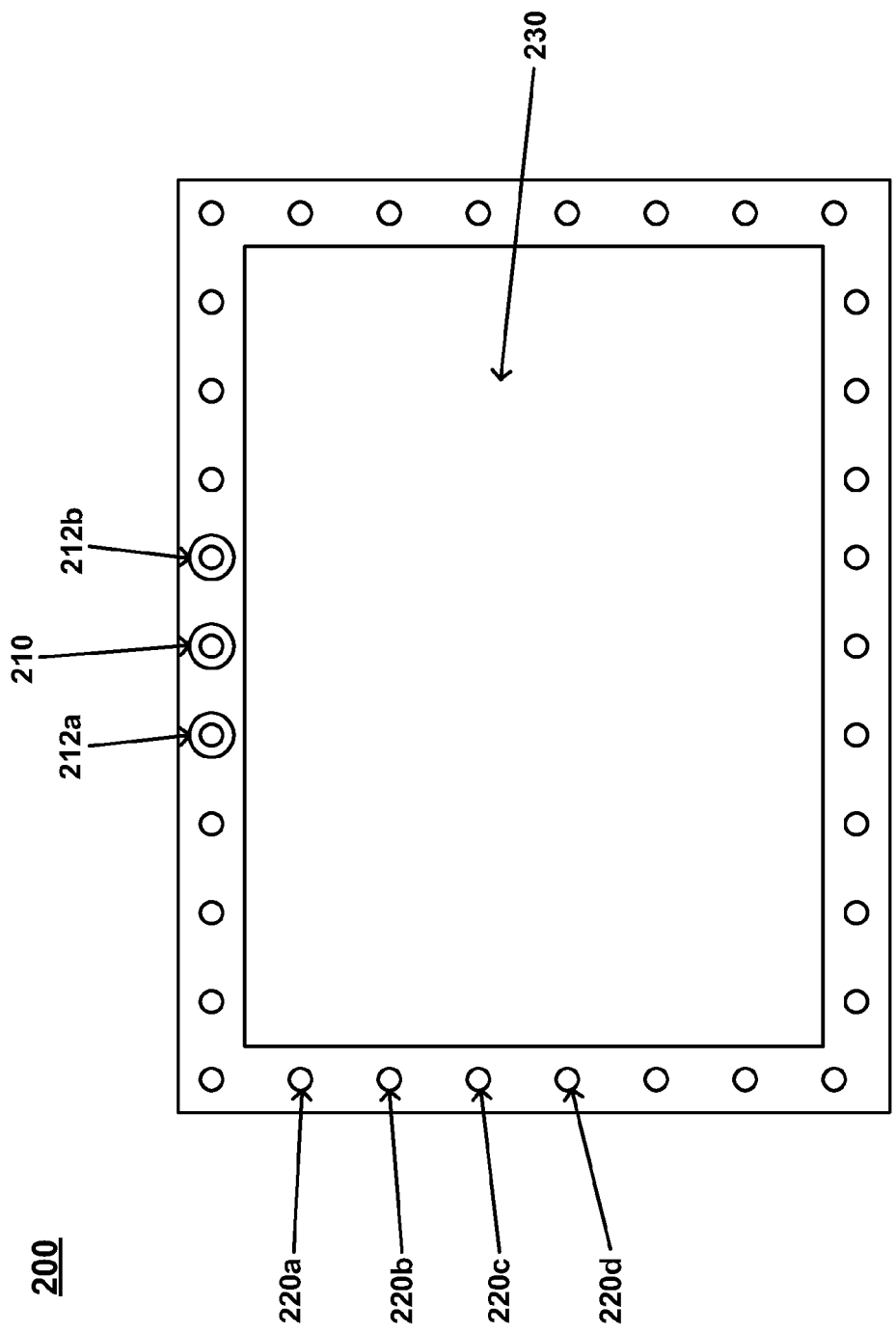
FIG. 2 is an illustration of an example display device including a plurality of cameras and a plurality of light sources, in accordance with one embodiment of the present invention.

FIG. 2 is an illustration of an example display device 200 including a plurality of cameras and a plurality of light sources, in accordance with one embodiment of the present invention. In the present embodiment, display device includes visible camera 210, infrared cameras 212a and 212b, light sources 220a-d, and electronic display 230. As shown, visible camera 210, infrared cameras 212a and 212b, and light sources 220a-d are adjacent to and surround electronic display 230. It should be appreciated that other embodiments of the present invention may include visible camera 210 without infrared cameras 212a and 212b. In another embodiment, display device 200 includes a plurality of cameras operable to capture infrared images, wherein at least one of the cameras is also operable to capture visible images.

During a video conferencing session, a person viewing electronic display 230 would be within the capture range of visible camera 210 and infrared cameras 212a and 212b. Moreover, in one embodiment, light sources, including light sources 220a-d, are positioned to project illumination onto different portions of the person. For example, light sources 220a-d, which are positioned on the left side of electronic display 230, would project light onto the left side of the person, e.g., the left side of the person's face. Similarly, light sources positioned on the right side of electronic display 230, would project light onto the right side of the person, e.g., the right side of the person's face.

In one embodiment, where display device 200 includes infrared cameras 212a and 212b, the light sources of display device 200, including light sources 220a-d, include infrared light sources for projecting infrared light onto the object. In another embodiment, where display device 200 does not include infrared cameras 212a and 212b, the light sources of display device 200, including light sources 220a-d, include visible light sources for projecting visible light onto the object. However, it should be appreciated that the light sources of device 200, including light sources 220a-d, may include both visible light sources and infrared light sources.

With reference again to FIG. 1, computer system 102 includes processor 135 and memory 145 having stored therein instructions that when executed by the processor execute illumination compensator 155. Illumination compensator 155 is operable to compensate for insufficient ambient illumination on at least a portion of an object by providing additional illumination using at least the individually controllable light sources.

Illumination compensator 155 receives a visible image captured by video capture device 105. In one embodiment, illumination compensator 155 samples image brightness of at least a portion of the visible image. In one embodiment, illumination compensator utilizes a feature detector to identify a face or facial region of a person. Face detectors generally operate by taking measurements of an image and identifying significant facial features. For example, in one embodiment, facial detection may be performed according to the object detection system disclosed in U.S. Pat. No. 7,099,510, entitled "Method and System for Object Detection in Digital Images." In the present embodiment, brightness is sampled on a portion of the visible image corresponding to a face.

Illumination compensator 155 then determines a difference between the sampled image brightness and a target brightness profile. A target brightness profile provides a baseline brightness for corresponding portions of the sampled portion of the object, e.g., the face. For example, a target brightness profile might provide a higher degree of brightness on one side of the face over the other side. In one embodiment, the target brightness profile provides a gradation of brightness. For example, the brightness can be one-third brighter on the right side of the face than the left. In another example, the brightness can linearly change from one side of the face to another side of the face, e.g., a linear distribution from darker to brighter. In another embodiment, the target brightness profile can be a flat profile. It should be appreciated that any target brightness profile can be used for comparison to the sampled image brightness. One example of target brightness would be to have one cheek region be one-third as bright as the other cheek region. This could be extrapolated to determine a brightness profile for the entire face.

In one embodiment, as presented above, light sources 125a-125d include individually controllable visible light sources for projecting visible light onto an object. In the present embodiment, illumination compensator 155 is also operable to compensate for the difference by controlling individually controllable light sources 125a-125d to project additional visible light onto the object. It should be appreciated that the difference can vary across the sampled portion of the visible image. For example, the sampled image brightness may include points that are of the same or greater brightness than the target brightness profile and other points that are of a lesser brightness than the target brightness profile. In one embodiment, the relative target brightness values are normalized since negative light cannot be added, at least in the case where one adds light with visible light sources.

In one embodiment, a system of equations that relates the light source powers to the determined difference for the sampled image brightness is solved to set the power for at least one of the light sources 125a-d. In one embodiment, light sources 125a-d are tuned individually and separately to project additional illumination onto the object, thus modifying the ambient illumination. Illumination provided by each light source 125a-d is tuned according to the difference between the sampled image brightness and the target brightness profile. In one embodiment, tuning the difference between the sampled image brightness and the target brightness profile is performed using weighted-least squares. In another embodiment, tuning the difference between the sampled image brightness and the target brightness profile is performed using convex optimization. It should be appreciated that the system of equations can be solved using other techniques, and is not limited to the described embodiments.

In another embodiment, the appearance of electronic display 115 may be used to modify the ambient illumination. For example, the brightness of pixels or regions of pixels of electronic display 115 may be increased in a similar manner as the increase in power of light sources 125a-d, to increase the ambient illumination. In other words, electronic display 115 may be modified as if additional light sources were used.

In one embodiment, the analysis of illumination compensator 155 may be used to provide a user with guidance regarding position of system 100 and/or video capture device 105. For example, if the scene is backlit a recommendation to the user to modify the laptop position or to close any shades in the room may be presented. In another example, if skin is blue and the background is dark it may be recommended that room lights to be turned on so color balance is not affected by the display colors reflecting on the face.

Where light sources 125a-d include individually controllable light sources, the scene is probed during video capture to modify the illumination using additional lights. Light sources 125a-d may, for example, be in the bezel of a monitor. In another embodiment, light sources 125a-d may be provided by the monitor display signals themselves. For example, the observed signals are the visible light video signals and the control signals are the multidimensional power signals going into light sources 125a-d, or the power signals going into electronic display 115 to modify the ambient light conditions.

In another embodiment, as presented above, light sources 125a-125d include individually controllable infrared light sources for projecting infrared light onto an object. In the present embodiment, video capture device 105 includes a plurality of infrared cameras configured to capture a plurality of infrared images at a predetermined frame rate. Illumination compensator is operable to calculate a plurality of surface normal vectors for a plurality of points of the visible image using the plurality of infrared images of the object.

In one embodiment, illumination compensator 155 is operable to modify the visible image of the object by using the plurality of surface normal vectors to virtually simulate adjusted illumination. It should be appreciated that the present embodiment allows for the virtual addition of illumination and the virtual removal of illumination.

In one embodiment, the modification of the visible image is made according to an interactive input provided by a user. In the present embodiment, in lieu of determining a difference between the sampled image brightness of at least the portion of the object and a target brightness profile, a user can provide an input to modify the visible image.

In another embodiment, a system of equations that relates a virtually simulated light source to the determined difference for the sampled image brightness is solved to set the virtually simulated light sources. In one embodiment, tuning the difference between the sampled image brightness and the target brightness profile is performed using weighted-least squares. In another embodiment, tuning the difference between the sampled image brightness and the target brightness profile is performed using convex optimization. It should be appreciated that the system of equations can be solved using other techniques, and is not limited to the described embodiments. One example of changing brightness by relighting using estimated surface normal vectors is found in patent U.S. Pat. No. 6,654,013, entitled "Apparatus and Method of Enhancing Shape Perception with Parametric Texture Maps."

It should be appreciated that the virtually simulated illumination may function in a similar manner as the additional illumination provided by light sources 125a-d. For example, the virtual simulated illumination may simulate a plurality of light sources. Moreover, the simulated light sources may provide light in different locations and at different directions. In various embodiments, the modeled surface reflectance illuminated with these simulated lights is diffuse, in an attempt to match the known diffuse reflectance response from actual skin. Moreover, the virtually simulated illumination may remove illumination, thereby providing for the removal of bright spots on the object.

In one embodiment, the frame rate required for the infrared images is lowered by using motion estimation between the infrared image images. More robust motion estimation, perhaps allowing even lower frame rates, may be possible by using the currently computed surface normal vectors to predict the appearance of the upcoming frames for the motion matching.

Figure 3:
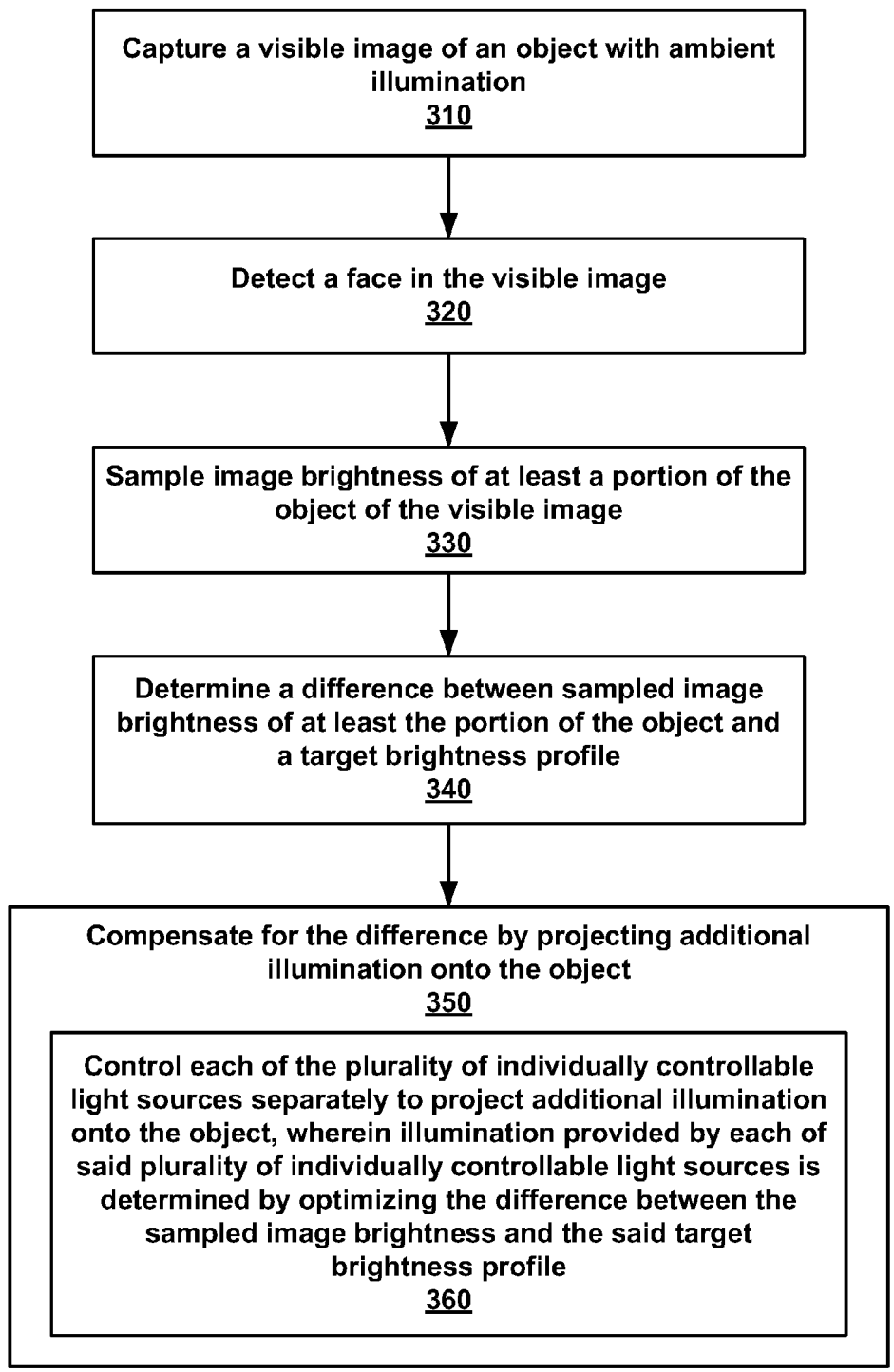
FIG. 3 is a flowchart illustrating a process for compensation of ambient illumination, in accordance with one embodiment of the present invention.

FIG. 3 is a flowchart illustrating a process 300 for compensation of ambient illumination, in accordance with one embodiment of the present invention. In one embodiment, process 300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 300 is performed by system 100 of FIG. 1.

At step 310 of process 300, a visible image of an object with ambient illumination is captured. In one embodiment, the visible image is captured using video capture device 105 of FIG. 1.

In one embodiment, as shown at step 320, a face is detected in the visible image. For example, a facial recognition processing may be applied to the visible image to identify a portion of the visible image corresponding to a face of a person.

At step 330, image brightness of at least a portion of the object of the visible image is sampled. In one embodiment, image brightness of a face region of the visible image is sampled. It should be appreciated that the sampling can be performed at any granularity, e.g., every ten pixels. Moreover, embodiments of the present invention can optionally perform sampling using spatial average samples rather than point samples.

At step 340, a difference between the sampled image brightness of at least the portion of the object and a target brightness profile is determined.

At step 350, difference between the sampled image brightness of at least the portion of the object and the target brightness profile is compensated for by projecting additional illumination onto the object. In one embodiment, the additional illumination includes a plurality of individually controllable visible light sources, e.g., light sources 125a-125d of FIG. 1.

In one embodiment, as shown at step 360, the compensation for the difference includes controlling each of the plurality of individually controllable light sources separately to project the additional illumination onto the object, wherein illumination provided by each of the plurality of individually controllable light sources is tuned according to the difference between the sampled image brightness and the target brightness profile.

In one embodiment, tuning the difference between the sampled image brightness and the target brightness profile is performed using weighted-least squares. In another embodiment, tuning the difference between the sampled image brightness and the target brightness profile is performed using convex optimization. It should be appreciated that the system of equations can be solved using other techniques, and is not limited to the described embodiments.

It should be appreciated that process 300 can be iteratively repeated, dynamically adjusting the ambient light according to changing conditions. It should also be appreciated that, in various embodiments, the target image brightness can be manually adjusted to allow video conference participants to adjust the lighting conditions.

Figure 4:
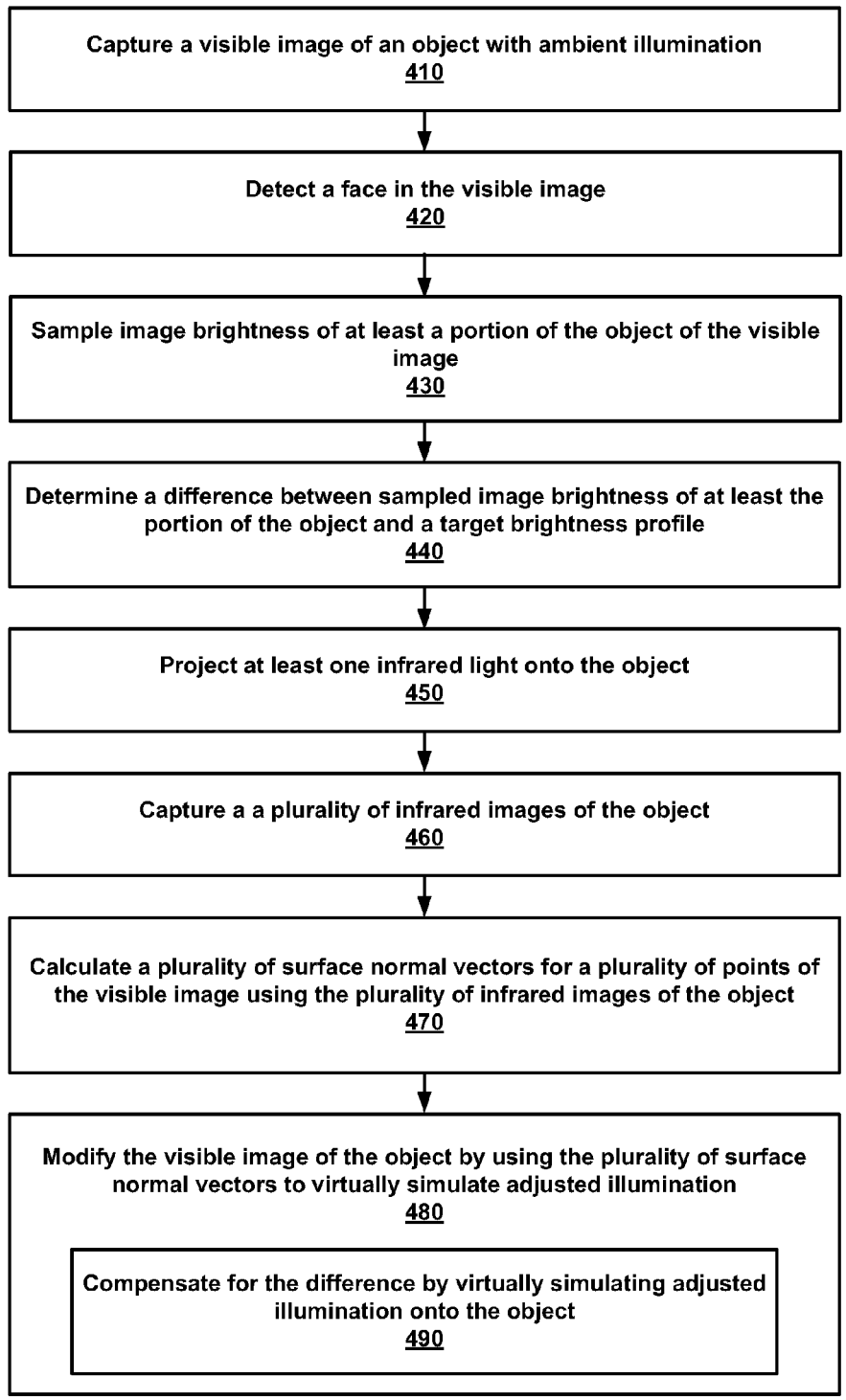
FIG. 4 is a flowchart illustrating a second process for compensation of ambient illumination, in accordance with one embodiment of the present invention.

FIG. 4 is a flowchart illustrating a second process for compensation of ambient illumination, in accordance with one embodiment of the present invention. In one embodiment, process 400 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. In one embodiment, process 400 is performed by system 100 of FIG. 1.

At step 410 of process 400, a visible image of an object with ambient illumination is captured. In one embodiment, the visible image is captured using video capture device 105 of FIG. 1.

In one embodiment, as shown at step 420, a face is detected in the visible image. For example, a facial recognition processing may be applied to the visible image to identify a portion of the visible image corresponding to a face of a person.

In one embodiment, as shown at step at step 430, image brightness of at least a portion of the object of the visible image is sampled. In one embodiment, image brightness of a face region of the visible image is sampled. It should be appreciated that the sampling can be performed at any granularity, e.g., every ten pixels.

In one embodiment, as shown at step at step 440, a difference between the sampled image brightness of at least the portion of the object and a target brightness profile is determined.

At step 450, at least on infrared light is projected onto the object. In one embodiment, the infrared light is projected using at least one of light sources 125a-d of FIG. 1.

At step 460, a plurality of infrared images of the object is captured. In one embodiment, the infrared images are is captured using video capture device 105 of FIG. 1.

At step 470, a plurality of surface normal vectors for a plurality of points of the visible image are calculated using the plurality of infrared images of the object.

At step 480, the visible image of the object is modified by using the plurality of surface normal vectors to virtually simulate adjusted illumination. It should be appreciated that the present embodiment allows for the virtual addition of illumination and the virtual removal of illumination. In one embodiment, where steps 430 and 440 are not performed, the modification is performed according to a user provide interactive input.

In one embodiment, as shown at step 490, the modification of the visible image includes compensating for the difference by virtually simulating adjusted illumination on the object.

It should be appreciated that process 400 can be iteratively repeated, dynamically adjusting the ambient light according to changing conditions. It should also be appreciated that, in various embodiments, the target image brightness can be manually adjusted to allow video conference participants to adjust the lighting conditions.

Embodiments of the present invention provide methods and systems for compensation of ambient illumination using individually controllable light sources. For example, the individually controllable light sources are used to modify the conditions of the video capture without providing a significant distraction to objects of the video capture. Various embodiments of the present invention provide additional illumination, either visible illumination projected onto an object or virtual illumination projected using detected surface normal vectors of a visible image of the object. The additional illumination improves the illumination of the scene, and thus the quality of the captured video.

Various embodiments of the present invention, compensation of ambient illumination, are thus described. While the present invention has been described in particular embodiments, it should be appreciated that the present invention should not be construed as limited by such embodiments, but rather construed according to the following claims.

What is claimed is:

1. A method for compensation of ambient illumination, said method comprising:
   capturing a visible image of an object with ambient illumination;
   sampling image brightness of at least a portion of said object of said visible image;
   determining a difference between sampled image brightness of at least said portion of said object and a target brightness profile;
   compensating for said difference by projecting additional illumination onto said object;
   projecting at least one infrared light onto said object;
   capturing a plurality of infrared images of said object;
   calculating a plurality of surface normal vectors for a plurality of points of said visible image using said plurality of infrared images of said object; and
   modifying said visible image of said object by using said plurality of surface normal vectors to virtually simulate adjusted illumination.

2. The method of claim wherein said portion of said object comprises a face.

3. The method of claim 2 further comprising:
   detecting said face in said visible image.

4. The method of claim 1 wherein said additional illumination comprises a plurality of individually controllable visible light sources.

5. The method of claim 4 wherein said compensating for said difference by projecting additional illumination onto said object profile comprises:
   controlling each of said plurality of individually controllable light sources separately to project said additional illumination onto said object, wherein illumination provided by each of said plurality of individually controllable light sources is tuned according to said difference between said sampled image brightness and said target brightness profile.

6. The method of claim 5 wherein tuning said difference between said sampled image brightness and said target brightness profile is performed using weighted-least squares.

7. The method of claim 5 wherein tuning said difference between said sampled image brightness and said target brightness profile is performed using convex optimization.

8. A tangible computer-readable storage medium for storing instructions that when executed by one or more processors perform a method for compensation of ambient illumination, said method comprising:
   capturing a visible image of an object with ambient illumination;
   sampling image brightness of at least a portion of said object of said visible image;
   determining a difference between sampled image brightness of at least said portion of said object and a target brightness profile;
   compensating for said difference by virtually simulating adjusted illumination on said object;
   projecting at least one infrared light onto said object;
   capturing a plurality of infrared images of said object;
   calculating a plurality of surface normal vectors for a plurality of points of said visible image using said plurality of infrared images of said object; and
   modifying said visible image of said object by using said plurality of surface normal vectors to virtually simulate adjusted illumination.

9. An electronic device comprising:
   at least one camera configured to capture images of an object with at least ambient illumination;
   an electronic display;
   a plurality of individually controllable light sources adjacent to said display for projecting illumination onto said object, wherein said individually controllable light sources comprise infrared light sources for projecting infrared light onto said object, and wherein said electronic device comprises a plurality of cameras configured to capture a plurality of infrared images;
   a processor; and
   a tangible computer-readable memory having stored therein instructions that when executed by said processor compensate for insufficient ambient illumination on at least a portion of said object by providing additional illumination using at least said individually controllable light sources, and wherein said tangible computer-readable memory also has stored therein instructions that when executed by said processor calculate a plurality of surface normal vectors for a plurality of points of a visible image using said plurality of infrared images of said object.

10. The electronic device of claim 9 wherein said individually controllable light sources are visible light sources for projecting visible light onto said object.

11. The electronic device of claim 10 wherein said tangible computer-readable memory also has stored therein instructions that when executed by said processor determine a difference between sampled image brightness of at least said portion of said object and a target brightness profile, wherein said processor compensates for said difference by controlling said plurality of individually controllable light sources to project additional visible light onto said object.

12. The electronic device of claim 9 wherein said individually controllable light sources are infrared light sources for projecting infrared light onto said object, wherein said electronic device comprises a plurality of cameras configured to capture a plurality of infrared images, and wherein said tangible computer-readable memory also has stored therein instructions that when executed by said processor calculate a plurality of surface normal vectors for a plurality of points of said visible image using said plurality of infrared images of said object.

13. The electronic device of claim 12 wherein said tangible computer-readable memory also has stored therein instructions that when executed by said processor modifies said visible image of said object by using said plurality of surface normal vectors to virtually simulate additional illumination.

* * * * *

UNITED STATES PATENT AND TRADEMARK OFFICE
CERTIFICATE OF CORRECTION

| | | |
|---|---|---|
| PATENT NO. | : 8,553,103 B1 | Page 1 of 1 |
| APPLICATION NO. | : 12/570700 | |
| DATED | : October 8, 2013 | |
| INVENTOR(S) | : Ramin Samadani et al. | |

It is certified that error appears in the above-identified patent and that said Letters Patent is hereby corrected as shown below:

In the Claims:

In column 9, line 21, in Claim 2, delete "claim" and insert -- claim 1 --, therefor.

Signed and Sealed this
Twenty-eighth Day of January, 2014

Michelle K. Lee
*Deputy Director of the United States Patent and Trademark Office*